United States Patent
Martin et al.

(10) Patent No.: US 10,956,610 B2
(45) Date of Patent: Mar. 23, 2021

(54) CYCLE WALKING-BASED TOKENIZATION

(71) Applicant: EntIT Software LLC, Sunnyvale, CA (US)

(72) Inventors: Luther Martin, Sunnyvale, CA (US); Timothy Roake, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 346 days.

(21) Appl. No.: 15/913,523

(22) Filed: Mar. 6, 2018

(65) Prior Publication Data

US 2019/0278941 A1    Sep. 12, 2019

(51) Int. Cl.
| | |
|---|---|
| H04N 7/16 | (2011.01) |
| G06F 7/04 | (2006.01) |
| G06F 21/62 | (2013.01) |
| G06F 16/901 | (2019.01) |
| G06F 16/903 | (2019.01) |
| G06Q 50/26 | (2012.01) |

(52) U.S. Cl.
CPC ...... *G06F 21/6254* (2013.01); *G06F 16/9017* (2019.01); *G06F 16/90344* (2019.01); *G06Q 50/265* (2013.01)

(58) Field of Classification Search
CPC ............ G06F 21/6254; G06F 16/9017; G06F 16/90344; G06Q 50/265
USPC ........................................................ 726/26
See application file for complete search history.

(56) References Cited

U.S. PATENT DOCUMENTS

| | | | |
|---|---|---|---|
| 6,654,717 B2* | 11/2003 | Loofbourrow | G06F 40/284 704/9 |
| 9,037,589 B2* | 5/2015 | Anderson | G06F 16/20 707/737 |
| 9,361,617 B2* | 6/2016 | von Mueller | G06Q 20/3823 |
| 9,736,142 B2* | 8/2017 | Davis | G06F 21/6209 |
| 2009/0310778 A1* | 12/2009 | Mueller | G06Q 20/3823 380/44 |
| 2012/0039469 A1* | 2/2012 | Mueller | G06Q 20/12 380/252 |
| 2015/0135038 A1* | 5/2015 | Wilson | G11C 29/76 714/773 |
| 2016/0019396 A1* | 1/2016 | Davis | H04L 63/0807 713/193 |
| 2017/0061403 A1* | 3/2017 | Reisgies | G06Q 20/385 |

FOREIGN PATENT DOCUMENTS

WO    WO2017123199 A1    7/2017

OTHER PUBLICATIONS

Ms. Manisha Saini; Big Data Analytics: Insights and Innovations; International Journal of Engineering Research and Development; vol. 6, Issue 10 (Apr. 2013), pp. 60-65.*

Manoj Debnath; "Exploring the Java String Tokenizer"; developer.com; Jun. 27, 2017; downloaded Nov. 21, 2017; www.developer.com.java/data/exploring-the java-string-tokenizer.html; 6 pages.

* cited by examiner

*Primary Examiner* — Monjur Rahim

(57) ABSTRACT

A technique includes accessing data representing plaintext. The plaintext has a first string size. The technique includes using a table to retrieve data representing a token that corresponds to the plaintext. The table has an associated string lookup size smaller than the first string size.

20 Claims, 6 Drawing Sheets

US 10,956,610 B2

CYCLE WALKING-BASED TOKENIZATION

BACKGROUND

A business organization (a retail business, a professional corporation, a financial institution, and so forth) may collect, process and/or store data that represents information about the private, professional and/or public lives of individuals. In this manner, the data may represent names, residence addresses, medical information, salaries, banking information, and so forth. The data may be plaintext data, which is ordinarily readable data. As examples, plaintext data may a sequence of character codes representing the residence address of an individual in a particular language; or the plaintext data may, for example, be a number that that conveys, in an Arabic or other number representation, a blood pressure reading.

As a control measure to safeguard individual privacy, a business organization may, through a process called "pseudonymization," convert plaintext data that represents underlying personal information to corresponding pseudonyms. A pseudonym has no exploitable meaning or value, and accordingly, a pseudonym ideally does not convey information that may be attributed to a specific individual without the use of additional information. One way to convert plaintext data to a corresponding pseudonym is to encrypt the plaintext data so that the resulting ciphertext forms the pseudonym. Another way to convert plaintext data to a corresponding pseudonym is to replace the plaintext data with a symbol, or token. The token, unlike a pseudonym that is formed by encryption, does not have a mathematical relationship to the corresponding plaintext data.

DETAILED DESCRIPTION

Figure 1:
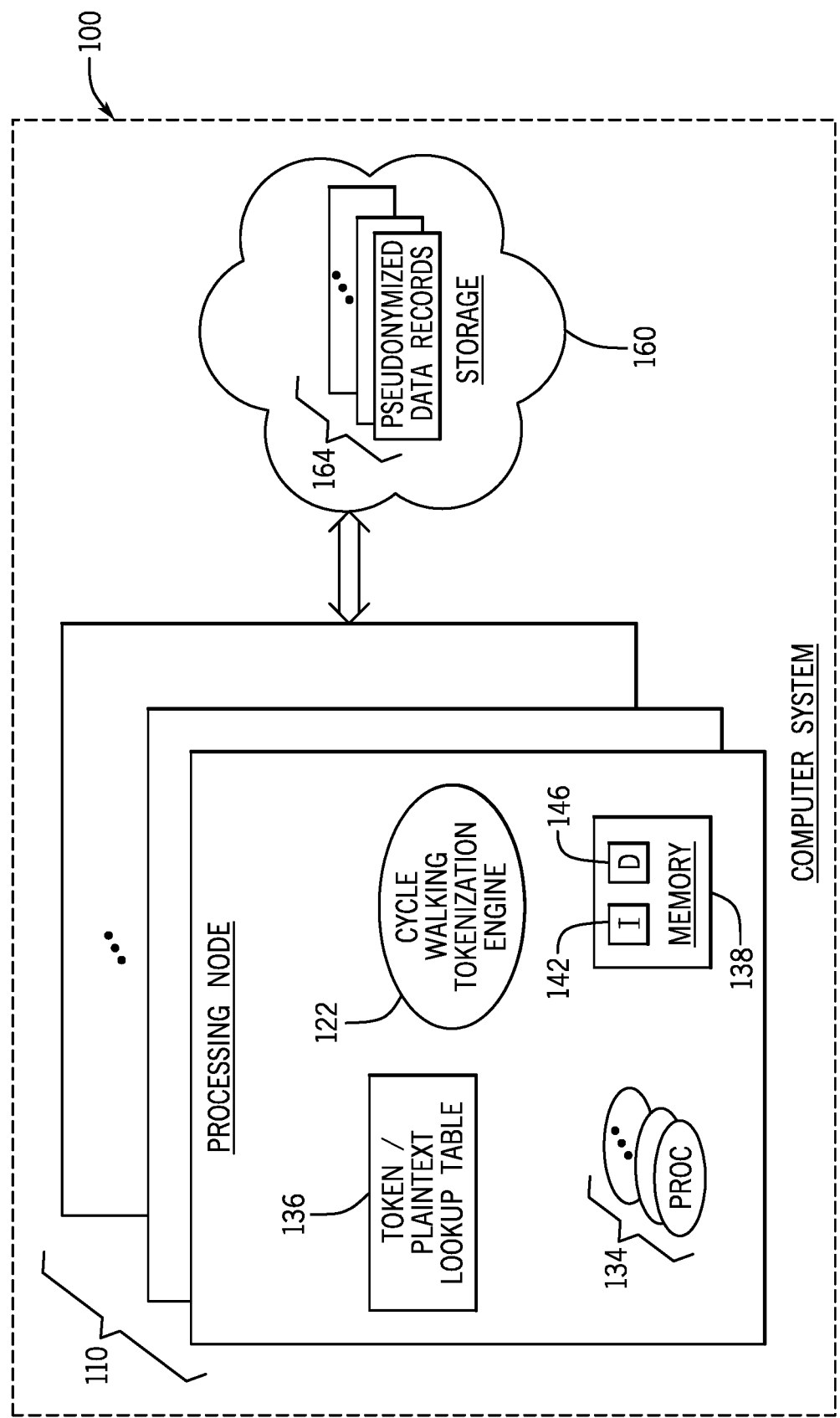
FIG. 1 is a schematic diagram of a computer system according to an example implementation.

For purposes of controlling access to sensitive information (information relating to confidential or sensitive information about a business enterprise, personal information about the public, private and/or professional lives or individuals, and so forth), plaintext data items, which represent the sensitive information, may be replaced with corresponding tokens. In this context, a "plaintext data item" (also referred to as "plaintext," "plaintext strings" and "plaintext items" herein) refers to a unit of data (a string, an integer, a real number, and so forth) that represents ordinarily readable content. As examples, a plaintext data item may be a string of character codes that corresponds to data that represents a name, or a residence address in the English language or other language; a number that conveys in a particular number representation (an Arabic representation) a blood pressure measurement or salary; a string of character codes representing a bank account number or an Internet Protocol (IP) address; and so forth. A "token" (also referred to as "token string" herein) refers to data, which has no exploitable meaning or value and in general does not convey information that can be attributed to a specific data subject without the use of additional information. Moreover, in accordance with example implementations, the token bears no mathematical relationship to the corresponding plaintext data item.

In accordance with example implementations, a token may be converted to a plaintext data item (and conversely, a plaintext data item may be converted to a token) through static conversion data. The static conversion data provides a consistent token for a given plaintext data item, and vice versa. In accordance with example implementations, the static conversion data is provided by one or multiple token/plaintext lookup tables. In accordance with example implementations, a token/plaintext lookup table may store token-plaintext pairs. A given token-plaintext pair includes a token and its corresponding plaintext, so that the token may be used to look up the corresponding plaintext, and vice versa.

In accordance with example implementations, the plaintext data item and the token may be strings that have the same length, or number of elements. In general, the string is a sequence of elements, wherein each element is selected from set of elements, such as a set of numbers and/or alphabet characters. For example, the elements may be selected from the numbers 0 to 9 and/or may include all characters of an alphabet. The base, or radix, of the string element defines the number of available characters and/or numbers for the string element. For example, for string elements that are formed from the letters of the English alphabet, the corresponding radix is twenty-six; and for a string element formed from the set of digits from zero to nine, the corresponding radix is ten.

The token/plaintext lookup table may be constructed to provide a result for a given string size, and as such, the table is said to have an associated string lookup size. For example, a given token/plaintext lookup table may have a string lookup size of six, i.e., the table may store token-plaintext pairs, in which, for each pair, the table stores a six element plaintext string and its corresponding six element token.

In general, the token/plaintext lookup table may have a length of $RADIX^{LENGTH}$ where "RADIX" represents the number of alphabet characters/integers that are available for each string element, and "LENGTH" represents the number of elements of the string. As a more specific example, for a string that includes four decimal digits (i.e., four digits of 0 to 9), the RADIX is 10, the LENGTH is four, and the size of the token/plaintext lookup table is 10,000.

For such reasons as reducing the memory footprint of a tokenization system, increasing its efficiency, and/or reducing the latency for converting a token string to its corresponding plaintext string (or vice versa), it may be advantageous to use a token/plaintext lookup table to perform a token or plaintext lookup for a string that is longer or shorter than the string lookup size (also called the "string size" herein) of the lookup table. Challenges may arise, however, in performing token/plaintext conversions when the length of the string/token being converted is less than the string lookup size of the table.

In accordance with example implementations that are described herein, a cycle walking tokenization engine uses cycle walking and string padding to convert between plaintext and token strings for the specific case when the size of the string being converted is less than the string lookup size of the table. More specifically, in accordance with example implementations, to tokenize a plaintext string having a length shorter than the string lookup size, the cycle walking tokenization engine first pads the plaintext string to increase the length of the plaintext string so that the padded plaintext string has the same length as the string lookup size of the table. Moreover, in accordance with example implementations, the padding may involve adding a sequence of "null" elements, such as adding a sequence of leading zeros (i.e., a prefix of zeroes) or adding a sequence of trailing zeros (i.e., a postfix of zeroes) to the plaintext string to increase the string's length. In other words, the padding may be performed to increase the number of elements of the plaintext string to match the string lookup size of the token/plaintext lookup table so that the table may be used to retrieve, or look up, a token string for the padded plaintext string.

For example, in accordance with some implementations, the string lookup size of the token/plaintext lookup table may be four elements, and the particular plaintext string may be, for example, "34," which has a length of two elements. In general, the goal is to use the token/plaintext lookup table, which is constructed to provide four element token lookups, to determine a two element token string that corresponds to the plaintext string of "34." Valid two element token strings may be, for example, in the range of "00" to 99;" and the token/plaintext lookup table may return token strings in the range of "0000" to "9999." In accordance with example implementations, the cycle walking tokenization engine may use leading zero padding and cycle walking in conjunction with this token/plaintext lookup table to determine a two element token string for the "34" plaintext string, as follows.

First, the cycle walking tokenization engine adds two leading zeroes to the "34" string to produce a corresponding string of "0034" for purposes of matching the string lookup size of the table for this example. The token/plaintext lookup table stores a token-plaintext pair, where "0034" is the plaintext entry for the pair, and the other entry for the pair is the corresponding four element token string. Accordingly, the cycle walking tokenization engine use the token/plaintext lookup table in a single table lookup to retrieve a four element token for the input plaintext string of "0034."

In accordance with example implementations, the cycle walking tokenization engine may next determine if the token string that is returned by the table lookup includes at least the same number of leading zeroes as the added padding. In particular, in accordance with example implementations, the cycle walking tokenization engine determines if the token string that is returned by the table lookup is of the form "00$N_1N_2$," and if so, then the substring "$N_1N_2$" (where $N_1$ and $N_2$ are each integers between 0 and 9) is the token string that is determined to correspond to the two element input plaintext string "34."

As a more specific example, the token string resulting from the table lookup may be "0046," i.e., for this example, the number of leading zeroes in the token string derived from the table lookup is the same as the number of leading zeros of the padded input plaintext string. For this example result, the cycle walking tokenization engine removes the leading padding zeroes, and the token conversion is complete: the token string of "46" corresponds to the plaintext input string of "34." As another example, if the table lookup returns a token string of "0007," then, the token conversion is complete, as "0007" corresponds to a token string of "07" with a padding of "00."

The number of leading zeroes in the token string that is returned by the table lookup may, however, not have at least the same number of leading zeros as the padding, and for this case, the cycle walking tokenization engine employs cycle walking in which the engine uses one or multiple additional table lookups (or "cycles" or "iterations") until the number of leading zeroes is equal to or greater than the number leading padding zeros.

In this context, "cycle walking" refers to multiple table lookups (or "cycles" or "iterations") in which the next table lookup is based on the result of the previous table lookup. As an example of the cycle walking, instead of the above example, the first table lookup for the plaintext string may return a token string of "0548." As the number leading zeroes is not at least two (i.e., the number of leading padding zeros added to "34"), the cycle walking tokenization engine uses the "0548" string as an input string (i.e., uses the "0548" string as another plaintext string) for purposes of using the token/plaintext table to look up another token string. The second table lookup may produce, for example, another token string of "0107," and for this example, the cycle walking tokenization engine again determines that the number of leading zeroes are not equal to or greater than the leading zero padding. Accordingly, the cycle walking tokenization engine uses a third table lookup (i.e., another cycle) with the input string of "0107," and on this third table lookup, a corresponding token value of "0067" (as an example) may be returned. At this point, the cycle walking tokenization engine determines that the number of leading zeroes of the returned token string is equal to or greater than the leading zero padding, and accordingly, "67" represents, for this example, the token string for the input plaintext string of "34."

Referring to FIG. 1, as a more specific example, in accordance with some implementations, tokenization (i.e., the process of converting plaintext to a token) and detokenization (i.e., the process of converting a token to plaintext) may be performed by a computer system 100. The computer system 100 may be a desktop computer, a server, a client, a tablet computer, a portable computer, a public cloud-based system, a private cloud-based system, a hybrid-based system (i.e., a system that has public and private cloud components), a private system having multiple computer components disposed on site, a private system having multiple computer components geographically distributed over multiple locations, and so forth.

Regardless of its particular form, in accordance with some implementations, the computer system 100 may include one or multiple processing nodes; and each processing node 110 may include one or multiple personal computers, workstations, servers, rack-mounted computers, special purpose computers, and so forth. Depending on the particular implementation, the processing nodes 110 may be located at the same geographical location or may be located at multiple geographical locations. Moreover, in accordance with some implementations, multiple processing nodes 110 may be rack-mounted computers, such that sets of the processing nodes 110 may be installed in the same rack. In accordance with further example implementations, the processing nodes 100 may be associated with multiple virtual machines that are hosted by one or multiple physical machines.

In accordance with some implementations, the processing nodes 110 may be coupled to a storage 160 of the computer system 100 through network fabric (not depicted in FIG. 1). In general, the network fabric may include components and use protocols that are associated with any type of communication network, such as (as examples) Fibre Channel networks, iSCSI networks, ATA over Ethernet (AoE) networks, HyperSCSI networks, local area networks (LANs), wide area networks (WANs), global networks (e.g., the Internet), mobile communication networks, or any combination thereof.

The storage 160 may include one or multiple physical storage devices that store data using one or multiple storage technologies, such as semiconductor device-based storage, phase change memory-based storage, magnetic material-based storage, memristor-based storage, and so forth. Depending on the particular implementation, the storage devices of the storage 160 may be located at the same geographical location or may be located at multiple geographical locations. Regardless of its particular form, the storage 160 may store pseudonymized data records 164, i.e., data records in which certain plaintext data items (plaintext strings, for example) have been replaced with corresponding pseudonyms. In accordance with example implementations, the pseudonyms are tokens, and one or multiple processing nodes 110 are constructed to convert the tokens into plaintext data items (for such purposes of processing the data records 164) and convert plaintext data items into tokens (for such purposes of creating the data records 164) using one or multiple token/plaintext lookup tables 136. Each token/plaintext lookup table 136 may have an associated string lookup size.

More specifically, in accordance with some implementations, a given processing node 110 may contain a cycle walking tokenization engine 122 that uses a token/plaintext lookup table 136 to convert plaintext strings to token strings, and vice versa, even when the string size being converted is less than the string lookup size of the table 136. In this manner, in accordance with example implementations, the token/plaintext lookup table 136 may have an associated string length, or size, and when the string being converted has a length, or size, that is less than the string size of the table 136, the cycle walking tokenization engine 122 uses string padding, cycle walking and lookups using the table 136 in the conversion.

In accordance with example implementations, the processing node 110 may include one or multiple physical hardware processors 134, such as one or multiple central processing units (CPUs), one or multiple CPU processor packages, one or multiple CPU cores, and so forth. Moreover, the processing node 110 may include a memory 138. In general, the memory 138 is a non-transitory memory that may be formed from, as examples, semiconductor storage devices, phase change storage devices, magnetic storage devices, memristor-based devices, a combination of storage devices associated with multiple storage technologies, and so forth.

Regardless of its particular form, the memory 138 may store various data 146 (data representing plaintext, tokens, plaintext strings, token strings, padded plaintext strings, padded token strings, strings produced by lookups involving the table 136, intermediate results in the tokenization or de-tokenization process, token-plaintext pairs for the table 136, and so forth). The memory 138 may store machine executable instructions 142 (i.e., "software") that, when executed by one or multiple processors 134, cause the processor(s) 134 to form one or multiple components of the processing node 110, such as, for example, the cycle walking tokenization engine 122.

In accordance with some implementations, the cycle walking tokenization engine 122 may be implemented at least in part by a hardware circuit that does not include a processor executing machine executable instructions. In this regard, in accordance with some implementations, the cycle walking engine 122 may be formed in whole or in part by a hardware processor that does not execute machine executable instructions, such as, for example, an application specific integrated circuit (ASIC), a field programmable gate array (FPGA), and so forth. Thus, many implementations are contemplated, which are within the scope of the appended claims.

Figure 2:
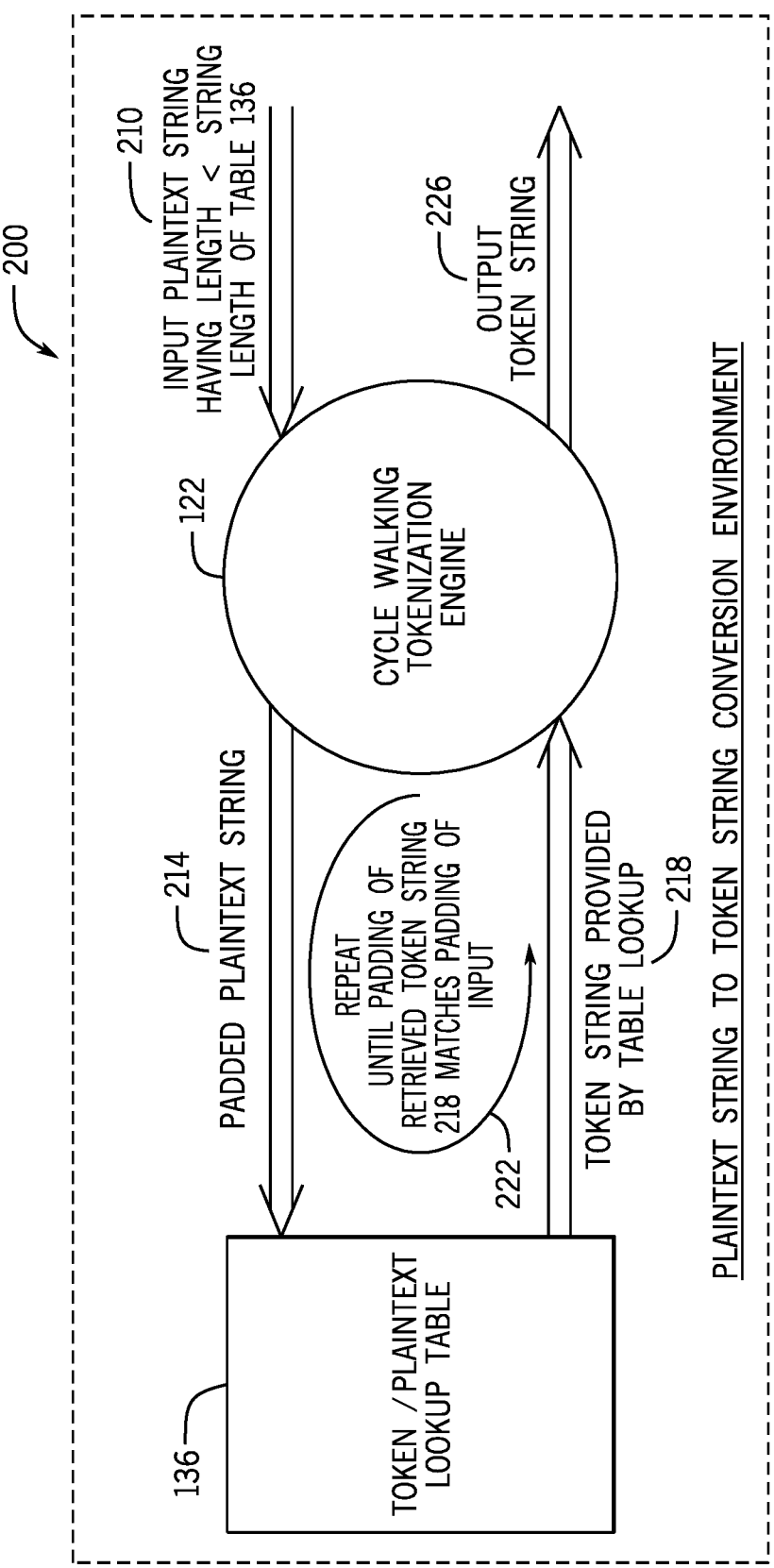
FIG. 2 is an illustration of an environment to convert a plaintext string to a token string according to an example implementation.

FIG. 2 depicts an illustration 200 of an environment of the computer system 100 of FIG. 1 for converting a plaintext string to a token string according to some implementations. Referring to FIG. 2 in conjunction with FIG. 1, in the conversion, the cycle walking tokenization engine 122 receives data representing an input plaintext string 210, which is to be converted to an output token string 226. For this example, the input plaintext string 210 has a size, or length, which is less than the string lookup size of the token/plaintext conversion table 136. The cycle walking tokenization engine 122 pads the input plaintext string 210 to produce a padded plaintext string 214, which is the input string used for the first of possible multiple table lookup iterations.

In accordance with some implementations, the cycle walking tokenization engine 122 may pad the input plaintext string 210 by adding leading zeroes to the plaintext string 210 to produce a string having a length equal to the string lookup size of the table 136. Elements other than zeros may be used as padding, in accordance with example implementations. Moreover, the padding may be added at the beginning, end or other part of the string; and the padding elements may different elements (the padding may not be all zeros, for example).

Using the padded plaintext string 214, the cycle walking tokenization engine 122 retrieves the token string 218 that is paired with the string 214 in the table 136. The token string 218 may or may not include leading zeroes, and if the string 218 includes leading zeroes, the number of leading zeroes or may not match the padding that was added to the padded plaintext string 214.

In this context, a "match" refers to the element(s) of the string 218 that correspond to the padding elements being the same as the padding elements. For example, if cycle walking tokenization engine 122 adds three leading zeros (the padding elements for this example) to the plaintext input string 210, then a "match" would be a token string 218 for which the first three elements of the string 218 are zeros (with the remaining part of the string 218 being the output token string 226). It is noted that a match may occur if the string 218 has more leading zeroes than the zeroes added as the padding (for implementations in which leading zeroes are used as the padding).

If the padding of the strings 214 and 218 do not match, then, in accordance with example implementations, the cycle walking tokenization engine 122 repeats (as indicated at reference number 222) the table lookup, using the token string 218 as the table input to find the token string paired with the string 218. The process may then repeat until the cycle walking tokenization engine 122 determines that the padding of the token string 218 matches the padding that was added to the input plaintext string 210. When this occurs, the cycle walking tokenization engine 122 removes the padding from the token string 218 to produce the corresponding token string 226.

Figure 3:
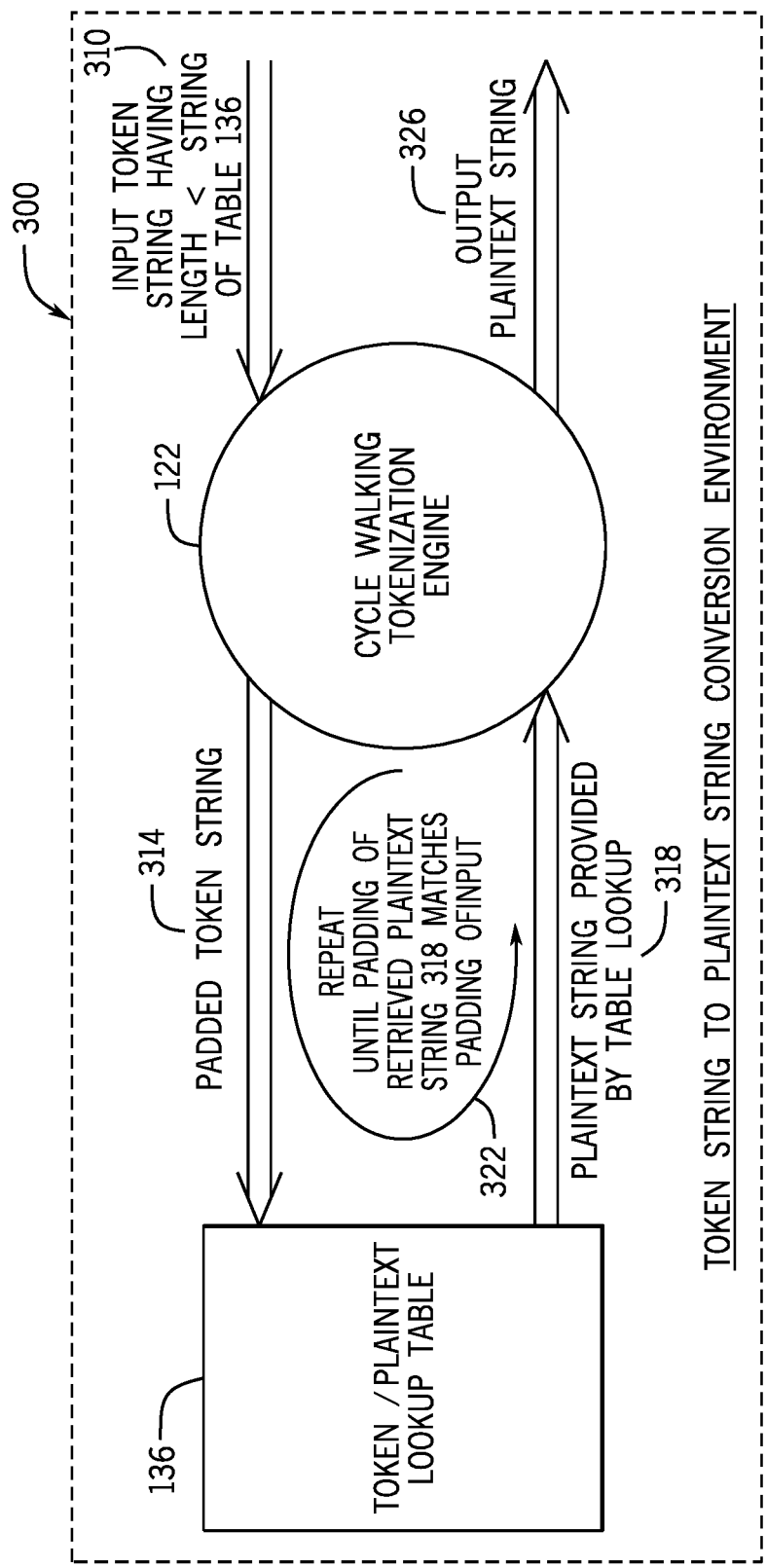
FIG. 3 is an illustration of an environment to convert a token string to a plaintext string according to an example implementation.

FIG. 3 depicts an environment 300 of the computer system 100 of FIG. 1 for converting a token string to a plaintext string according to some implementations. Referring to FIG. 3 in conjunction with FIG. 1 in the conversion, the cycle walking tokenization engine 122 receives data representing an input token string 310, which is to be converted to an output plaintext string 326. For this example, the input token string 310 has a size, or length, which is less than the string lookup size of the token/plaintext conversion table 136. The cycle walking tokenization engine 122 pads the input token string 310 to produce a padded token string 314, which is the input string used for the first of possible multiple table lookup iterations.

In accordance with some implementations, the cycle walking tokenization engine 122 may pad the input token string 310 by adding leading zeroes to the token string 310 to produce a string having a length equal to the string lookup size of the table 136. Using the padded token string 314, the cycle walking tokenization engine 122 retrieves the plaintext string 318 that is paired with the string 314 in the table 136. The plaintext string 318 may or may not include a padding (a string of leading zeroes, for example), and if the string 318 includes a padding, the number of padding elements may or may not match the padding of the padded token string 314. If the padding of the strings 314 and 318 do not match, then, in accordance with example implementations, the cycle walking tokenization engine 122 repeats (as indicated at reference number 322) the table lookup, using the plaintext string 318 as the table input to find the plaintext string paired with the string 318. The process may then repeat until the cycle walking tokenization engine 122 determines that the padding of the plaintext string 318 matches the padding that was added to the input token string 3101. When this occurs, the cycle walking tokenization engine 122 removes the padding from the plaintext string 318 to produce the corresponding plaintext string 326.

Figure 4:
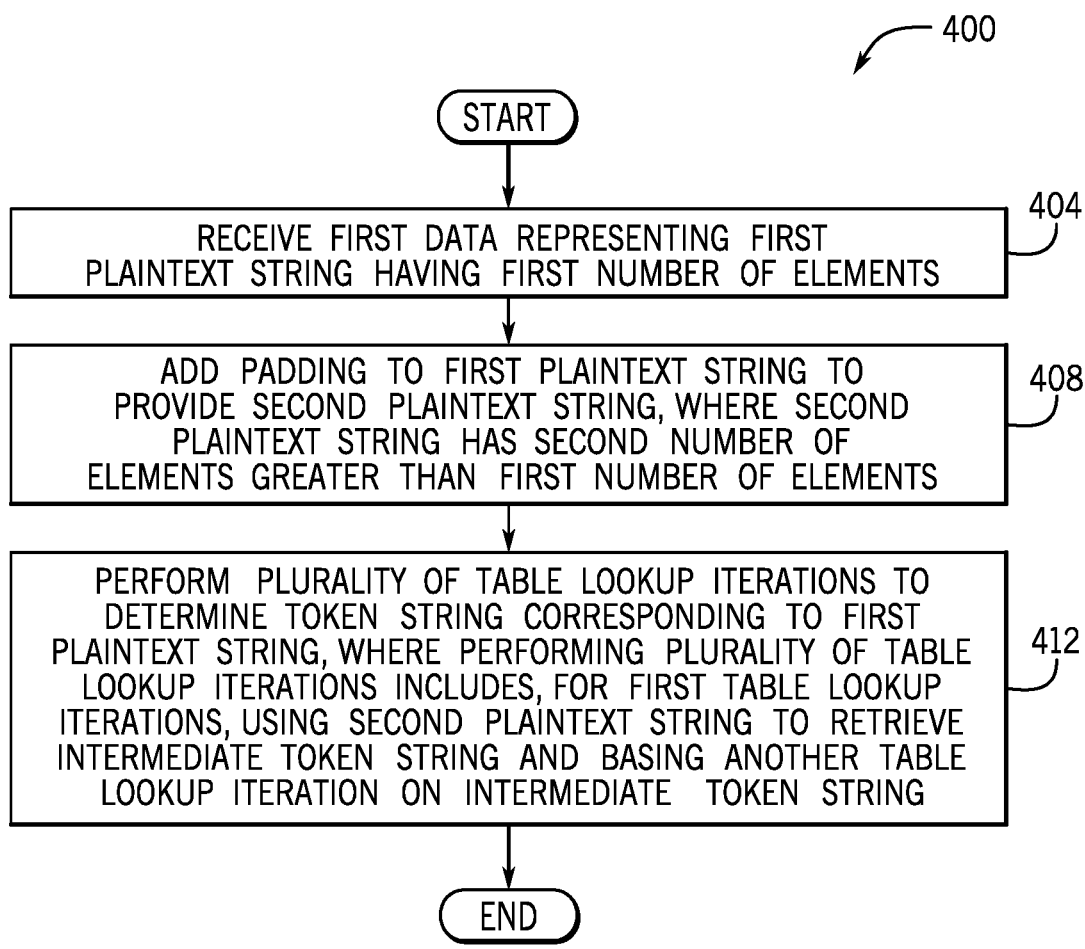
FIG. 4 is a flow diagram depicting a technique to determine a token string corresponding to a plaintext string according to an example implementation.
Figure 5:
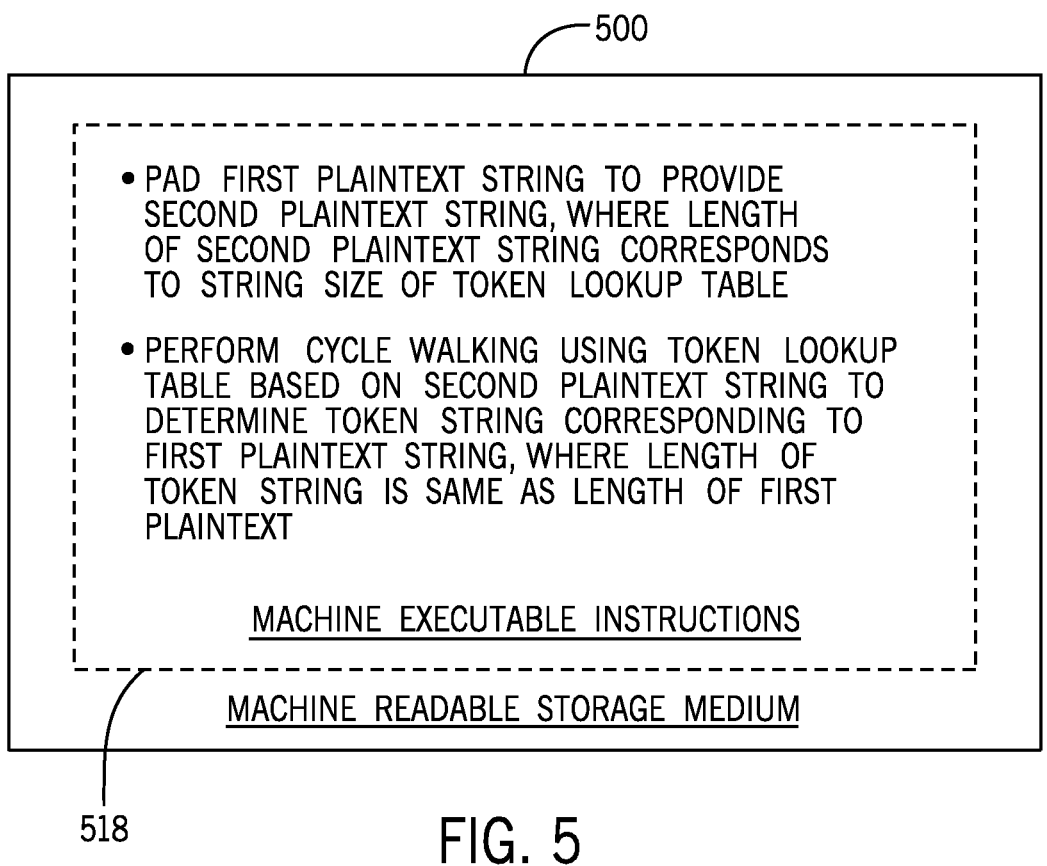
FIG. 5 is an illustration of a non-transitory computer readable storage medium storing instructions that, when executed by a machine, cause the machine to perform cycle walking using a token lookup table to provide a token string corresponding to a plaintext string according to an example implementation.

Thus, referring to FIG. 4, in accordance with example implementations, a technique 400 includes receiving (block 404) first data representing a first plaintext string having a first number of elements; and adding (block 408) a padding to the first plaintext string to provide a second plaintext string. The second plaintext string has a second number of elements greater than the first number of fields. The technique 500 includes performing (block 412) a plurality of table lookup iterations to determine a token string corresponding to the first plaintext string. Performing the table lookup iterations includes, for a first table lookup iteration, using the second plaintext string to retrieve an intermediate token string, and basing another table lookup iteration on the intermediate token string Referring to FIG. 5, in accordance with example implementations, a non-transitory machine readable storage medium 500 stores instructions 518 that, when executed by a machine, cause the machine to pad a first plaintext string to provide a second plaintext string. A length of the second plaintext string corresponds to a string size of a token lookup table. The instructions 518, when executed by the machine, cause the machine to perform cycle walking using the token lookup table and based on the second plaintext string to determine a token string corresponding to the first plaintext string. The length of the token string is the same as the length of the first plaintext string.

Figure 6:
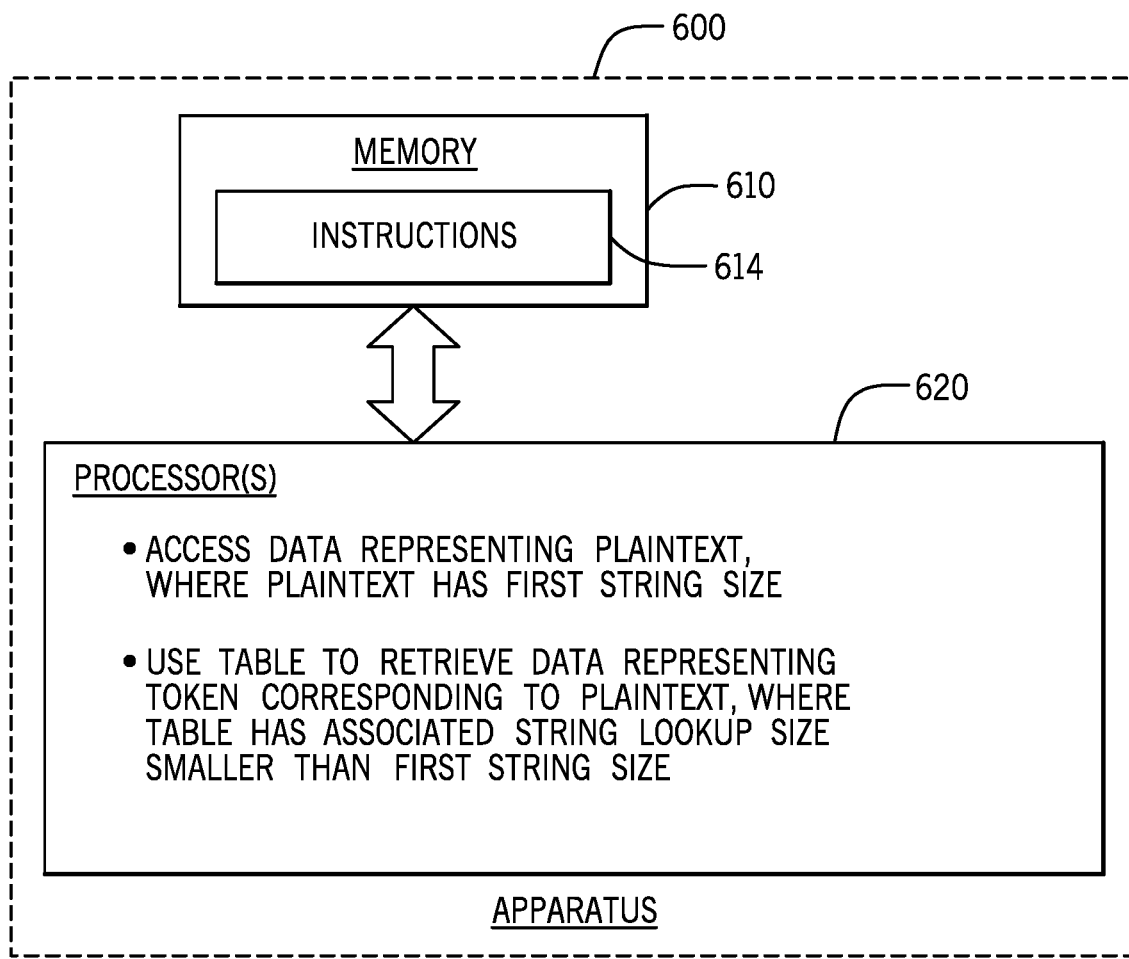
FIG. 6 is an apparatus to apply cycle walking to convert a token to plaintext for the case in which the token has an associated size less than a lookup size of a token-to-plaintext conversion table according to an example implementation.

Referring to FIG. 6, in accordance with example implementations, an apparatus 600 includes at least one processor 620 and a memory 610. The memory 610 stores instructions 614 that, when executed by the processor(s) 620, cause the processor 620 to access data representing plaintext, where the plaintext has a first string size; and use a table to retrieve data representing a token corresponding to the plaintext. The table has an associated string lookup size smaller than the first string size.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A non-transitory machine readable storage medium storing, instructions that, when executed by a machine, cause the machine to:
receive data representing an input plaintext string, wherein the input plaintext string has a length less than a string lookup size of a token-plaintext lookup table;
add a particular padding to the input plaintext string to provide a padded plaintext string having a length equal to the string lookup size of the token-plaintext lookup table;
perform a plurality of table lookup iterations using the padded plaintext string as an initial input to the token-plaintext lookup table until identifying a final token string having a padding that matches the particular padding added to the input plaintext string, wherein, in the plurality of table lookup iterations, a next table lookup iteration is performed using a token string generated from a previous table lookup iteration; and
generate an output token string corresponding to the input plaintext string based on the final token string.

2. The non-transitory machine readable storage medium of claim 1, wherein the length of the input plaintext string is measured by a number of elements of the input plaintext string.

3. The non-transitory machine readable storage medium of claim 1, wherein the token-plaintext lookup table stores a plurality of token strings respectively mapped to a plurality of plaintext strings, and each plaintext string of the plurality of plaintext strings has a same length as the string lookup size of the token-plaintext lookup table.

4. The non-transitory machine readable storage medium of claim 1, wherein, to add the particular padding, the instructions, when executed by the machine, cause the machine to insert one null element or multiple null elements to the input plaintext string to increase the length of the input plaintext string.

5. The non-transitory machine readable storage medium of claim 4, wherein the one null element or multiple null elements comprise a string of zeroes.

6. The non-transitory machine readable storage medium of claim 4, wherein the one null element or multiple null elements comprise a prefix of zeroes.

7. The non-transitory machine readable storage medium of claim 1, wherein the instructions, when executed by the machine, further cause the machine to, for a given table lookup iteration:
determine a candidate token value based on an input plaintext value;
identify a padding of the candidate token value; and
in response to determining that the padding of the candidate token value has a longer length than the particular padding that was added to the input plaintext string, initiate another table lookup iteration.

8. The non-transitory machine readable storage medium of claim 1, wherein the instructions, when executed by the machine, further cause the machine to use the plurality of table lookup iterations to convert plaintext data comprising the input plaintext string into corresponding tokens while preserving a format of the plaintext data.

9. A method comprising:
receiving data representing an input plaintext string having a length less than a string lookup size of a token-plaintext lookup table;
adding a particular padding to the input plaintext string to provide a padded plaintext string having a length equal to the string lookup size of the token-plaintext lookup table;
performing a plurality of table lookup iterations using the padded plaintext string as an initial input to the token-plaintext lookup table until identifying a final token string having a padding that matches the particular padding added to the input plaintext string, wherein performing the plurality of table lookup iterations comprises performing a next table lookup iteration based on a token string generated from a previous table lookup iteration; and
generating an output token string corresponding to the input plaintext string based on the final token string.

10. The method claim 9, wherein adding the particular padding to the input plaintext string comprises adding a number of leading zeroes to the input plaintext string equal to a difference between the string lookup size and the length of the input plaintext string.

11. The method of claim 9, wherein performing a given table lookup iteration of the plurality of table lookup iterations comprises:
determining a candidate token string corresponding to a plaintext value in the token-plaintext table;
determining whether the candidate token string has a same number of padding elements as the particular padding; and
in response to determining that the candidate token string has the same number of padding elements as the particular padding, identifying the candidate token string as the final token string.

12. The method of claim 9, wherein adding the particular padding comprises adding a leading string of null elements or adding a trailing string of null elements to the input plaintext string.

13. The method of claim 11, further comprising:
in response to determining that the candidate token string does not have the same number of padding elements as the particular padding, performing another table lookup iteration of the plurality of table lookup iterations using the candidate token string as a next plaintext value to look up in the token-plaintext lookup table.

14. An apparatus comprising:
at least one processor; and
a memory storing instructions that, when executed by the at least one processor, cause the at least one processor to:
receive data representing an input plaintext string having a length less than a string lookup size of a token-plaintext lookup table;
add a particular padding to the input plaintext string to provide a padded plaintext string having a length equal to the string lookup size of the token-plaintext lookup table;
perform a plurality of table lookup iterations using the padded plaintext string as an initial input to the token-plaintext lookup table until identifying a final token string having a padding that matches the particular padding added to the input plaintext string, wherein, in the plurality of table lookup iterations, a next table lookup is performed using a token string generated from a previous table lookup; and
generate an output token string corresponding to the input plaintext string based on the final token string.

15. The apparatus of claim 14, wherein the particular padding comprises trailing zeros that are added at an end of the input plaintext string.

16. The apparatus of claim 14, wherein the particular padding comprises leading zeros that are added at a beginning of the input plaintext string.

17. The apparatus of claim 14, wherein the token-plaintext lookup table stores a plurality of token strings respectively mapped to a plurality of plaintext strings, and each plaintext string of the plurality of plaintext strings has a same length as the string lookup size of the token-plaintext lookup table.

18. The apparatus of claim 14, wherein, to perform a given table lookup iteration of the plurality of table lookup iterations, the instructions, when executed by the at least one processor, cause the at least one processor to:
determine a candidate token string corresponding to a plaintext value in the token-plaintext lookup table;
determine whether the candidate token string has a same number of padding elements as the particular padding; and
in response to a determination that the candidate token string does not have the same number of padding elements as the particular padding, perform another table lookup iteration using the candidate token string as a next plaintext value to look up in the token-plaintext lookup table.

19. The apparatus of claim 18, wherein the instructions, when executed by the at least one processor, cause the at least one processor to:
in response to a determination that the candidate token string has the same number of padding elements as the particular padding, identify the candidate token string as the final token string.

20. The apparatus of claim 19, wherein the instructions, when executed by the at least one processor, further cause the at least one processor to:
remove the padding elements of the candidate token string to generate the output token string corresponding to the input plaintext string.

* * * * *